United States Patent [19]
Onogi et al.

[11] Patent Number: 5,532,768
[45] Date of Patent: Jul. 2, 1996

[54] CONTACT LENS

[75] Inventors: Takayuki Onogi, Nagoya; Keiji Yamashita; Kazuya Miyamura, both of Seki, all of Japan

[73] Assignee: Menicon Co., Ltd., Nagoya, Japan

[21] Appl. No.: 130,728

[22] Filed: Oct. 4, 1993

[51] Int. Cl.⁶ .................................................. G02C 7/04
[52] U.S. Cl. ........................................ 351/160 R; 351/161
[58] Field of Search ...................... 351/160 R, 160 H, 351/161, 162

[56] References Cited

U.S. PATENT DOCUMENTS

| | | | |
|---|---|---|---|
| 4,095,878 | 6/1978 | Fanti | 351/161 |
| 4,324,461 | 4/1982 | Salvatori | 351/161 |
| 4,508,436 | 4/1985 | Sitterle | 351/161 |
| 4,573,774 | 3/1986 | Sitterle | 351/161 |
| 4,618,228 | 10/1986 | Baron et al. | 351/161 |
| 4,628,229 | 10/1986 | Jacobstein et al. | 351/161 |
| 4,813,777 | 3/1989 | Rainville et al. | 351/161 |
| 5,020,898 | 6/1991 | Townsley | 351/161 |
| 5,076,683 | 12/1991 | Glick | 351/161 X |

FOREIGN PATENT DOCUMENTS

| | | |
|---|---|---|
| 0008726 | 3/1980 | European Pat. Off. . |
| 0062178 | 10/1982 | European Pat. Off. . |
| 0102223 | 3/1984 | European Pat. Off. . |
| 0452549 | 10/1991 | European Pat. Off. . |
| 3003985 | 8/1981 | Germany . |
| 37-18531 | 12/1962 | Japan . |
| 48-13048 | 2/1973 | Japan . |
| 50-133151 | 11/1975 | Japan . |
| 2041557 | 9/1980 | United Kingdom . |

*Primary Examiner*—Scott J. Sugarman
*Attorney, Agent, or Firm*—Oblon, Spivak, McClelland, Maier & Neustadt

[57] ABSTRACT

The inner and outer surfaces of a toric contact lens have respectively a curved surface having a different radius of curvature wherein the central axis of the outer surface is deviated downwardly from the central axis of the inner surface. Accordingly, the position of the gravity center of the lens is lowered because the lower portion of the lens is thicker than the upper portion. Further, slab-off portions are formed in the upper and lower portions of the outer surface of the lens. The contact lens of the present invention can prevent the rotation of the lens on the cornea, provides a good feeling to a wearer, and is safe in use.

6 Claims, 5 Drawing Sheets

CONTACT LENS

BACKGROUND OF THE INVENTION

1. Field of the Invention

The present invention relates to a contact lens for correcting astigmatism or presbyopia. More particularly, it relates to a toric contact lens or a multifocal (bifocal) contact lens capable of preventing the rotation of it on the eye during use.

The astigmatism is a state that parallel beams do not form an image at a point and the presbyopia is a state that a man becomes unable to attain a sharp focus for near vision due to the reduction of elasticity of the crystalline lens. In order to correct the astigmatism or presbyopia, glasses or a contact lens is usually used.

2. Discussion of the Background

As a contact lens to correct the astigmatism, there is known a toric contact lens wherein the radius of curvature of the inner (back) and/or the outer (front) surfaces is different from each other in terms of two orthogonally intersecting meridians.

As a contact lens to correct the presbyopia, there is known a multifocal (bifocal) contact lens wherein a plurality of areas of the degree of lens power are formed at the inner (back) and/or outer (front) surfaces in order to see near and distant objects.

For a patient of astigmatism, it is necessary to wear a toric contact lens at a correct position on a human eye.

There are various kinds of multifocal contact lens to be worn by patients of presbyopia, some kinds of multifocal contact lens have to be worn at a fixed position to the human eyes in the same manner as the toric contact lens. The multifocal contact lens of the above-mentioned kind is such that the areas of the different degrees of lens power formed in the contact lens are not at the positions of rotation symmetry when the lens is viewed from the front side. When glasses are used, a frame holding lenses is fitted to the ears or the nose. Accordingly, the correct position of the lenses can be assured. However, when a toric contact lens or a certain kind of multifocal contact lens is used, there is no means to fix the lenses, and accordingly, the contact lenses tend to rotate on the eye, whereby it may not obtain proper correction.

For the toric contact lens or the multifocal contact lens, there have been proposed various improvements to prevent the rotation of the lens on the eye. The proposed improvements can be generally classified into two types.

The first type is called a ballast type wherein the lower portion of the contact lens is relatively made heavy to thereby prevent the rotation of the lens on the eye (the cornea). A bifocal (multifocal) type contact lens 31 (FIG. 7) which belongs this type, has been known (for instance, in Japanese Examined Patent Publication No. 18531/1962).

The second type is such one as to correspond to the shape of the eye of a wearer so that the rotation of the lens on the cornea can be prevented. The second type can also be classified into two types: a truncation type and a slab-off type. In the truncation type, a cut portion (a truncated portion) 33 is formed at a part of the outer periphery of a contact lens (FIG. 8), which is disclosed in, for instance, Japanese Unexamined Utility Model Publication No. 13048/1973). In the slab-off type, a thin portion 35 is formed in a contact lens 34 (FIG. 9) which is disclosed in, for instance, Japanese Unexamined Utility Model Publication No. 133151/1975.

In the ballast type contact lens, the thickness in a portion of the lens is increased to shift the gravity center to the lower portion. Therefore, the ballast type contact lens has a disadvantage that a wearer may feel a pressure on the eye, discomfort or pain. In order to improve the discomfort, a so-called prism ballast type contact lens is proposed wherein the central axis of the outer surface of the contact lens is deviated from the central axis of the inner surface so that the thickness of the lens is gradually increased downwardly. The proposed prism ballast type contact lens has, however, such a disadvantage that when a lens is designed in accordance with the parameters (such as the degree of lens power), there may result a thicker portion in the lens, to which a wearer cannot endure. Further, as the thickness of the lens is increased, an amount of oxygen to be transmitted therethrough is reduced, whereby the cornea may be injured.

On the other hand, since the truncation type contact lens is so formed that the peripheral region of the lens in a plane view is not smooth, a wearer may feel discomfort when the lens is worn. In order to improve the feeling of wearing, it is necessary to finish the truncated portion smoothly. However, it requires high skill and technique. Further, even though a truncated portion having a smooth surface is formed, sufficient effect cannot be expected depending on the shape of eyelid of a wearer.

In the slab-off type contact lens, there is no problem on the feeling of wearing. However, the contact lens has its gravity center which coincides with geometric center. Accordingly, there is a problem of stability because the lens may rotate on the cornea when the eye blinks.

In order to solve the problems of the ballast type, the truncation type and the slab-off type contact lens as described above, a technique in combination of the ballast type and the slab-off type has been proposed as follows.

Firstly, in U.S. Pat. No. 4,324,461, a thin wall portion (hereinbelow, referred to as a slab-off portion) is formed at the upper portion of a lens to shift the gravity center downwardly.

Secondly, in U.S. Pat. No. 5,020,898, slab-off portions are formed at the upper and lower portions of a lens to thereby shift the gravity center downwardly. In these proposals, however, it is difficult to assure a proper deviation of the gravity center necessary for preventing the rotation of the lens on the cornea. Further, excellent and stable eyesight may not be obtained.

There is another proposal wherein a slab-off portion is formed in the lower portion of the lens and a prism is formed in the lens to make the lower portion of the lens heavy (U.S. Pat. Nos. 4,508,436 and 4,573,774). In the proposal, however, the position of the gravity center is moved upwardly since the slab-off portion is formed in the lower portion of the lens, whereby there is little effect to prevent the rotation of the lens on the eye.

SUMMARY OF THE INVENTION

It is an object of the present invention to eliminate the problems of the above-mentioned techniques and to provide a thin toric or multifocal (bifocal) contact lens for certainly preventing the rotation on the cornea, providing comfort feeling and assuring safe use.

Conventionally, a prism ballast type contact lens, which is for stabilizing the rotation of the lens by forming a prism ballast, has been so designed and developed as to how much amount of prism is formed, i.e., depending on a quantity of prism (a degree of prism diopter). The inventors of the application have completed the present invention from a new viewpoint. Namely, they have considered how much the amount of a deviation rate or an offset is resulted by the employment of a prism ballast, and have designed and developed the lens so that a suitable effect of ballast can be obtained by making the lens thin as possible.

The deviation rate or the offset means the percentage of the distance (deviation quantity) between the geometric center of the lens in the front view of the lens and the gravity center. Namely, when the gravity center of the contact lens having a total diameter of 14 mm is offset by 0.6 mm from the geometric center, the deviation rate is 0.6÷14×100=4.3 (%). In this case, the deviation quantity is 0.6 mm. As a result, the inventors have found that sufficient stability to the rotation of the lens can be obtained by determining the deviation rate from the geometric center of the lens in a range from 2.5% to 7.5% which is applicable to the parameters for all toric or multifocal (bifocal) contact lenses.

In accordance with the present invention, there is provided a toric or multifocal (bifocal) contact lens having a prism ballast shape and the gravity center deviated downwardly from its geometric center, characterized in that thinner wall regions are formed in at least upper and lower peripheral portions of the lens.

In the present invention, the toric or multifocal (bifocal) contact lens preferably has the deviation rate of the gravity center from the geometric center in a range from 2.5% to 7.5%.

DESCRIPTION OF THE PREFERRED EMBODIMENTS

Preferred embodiments of the contact lens according to the present invention will be described with reference to the drawings.

Figure 1:
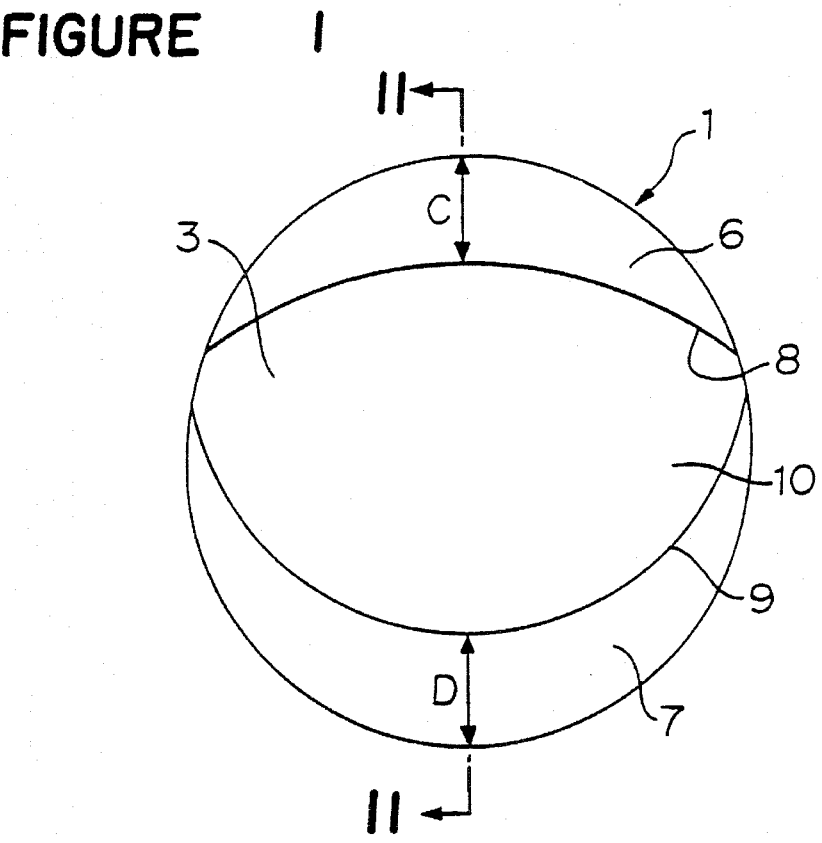
FIG. 1 is a front view showing a first embodiment of the toric contact lens according to the present invention.
Figure 2:
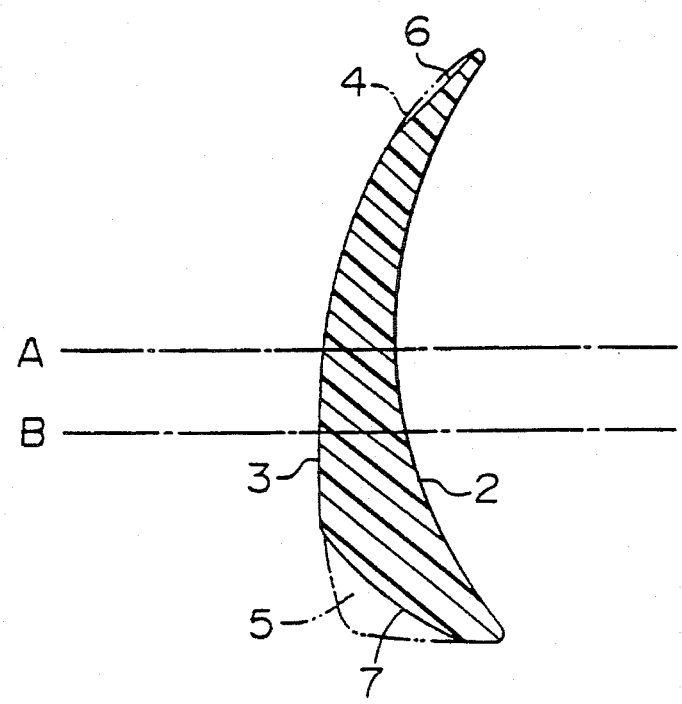
FIG. 2 is a cross-sectional view taken along a line II—II of the toric contact lens in FIG. 1.

As shown in FIGS. 1 and 2, a toric contact lens 1 has a prism ballast shape as a whole. Namely, the inner surface 2 (back surface) and the outer surface (front surface) 3 of the lens 1 are respectively formed of a spherical surface and a toric surface wherein the central axis B of the outer surface 3 is determined at a position lower than the central axis A of the inner surface 2, and the both central axis A, B extend in parallel. Accordingly, the thickness of the toric contact lens 1 increases downwardly whereby the gravity center is shifted downwardly (FIG. 2). Further, spherical cut surfaces 6, 7 (surfaces resulted by forming slab-off portions) are formed respectively in upper and lower slab-off portions 4, 5 of the toric contact lens 1. Numeral 8 designates the border line between the outer surface 3 and the cut surface 6, and numeral 9 designates the boarder line between the outer surface 3 and the cut surface 7. The region 10 surrounded by the border lines 8 and 9 provides an effective optical zone which actually functions as a contact lens.

The outer surface 3 is provided with a toric surface which comprises curved surfaces having different radius of curvatures in the directions of two orthogonally intersecting meridians. The toric surface corrects astigmatism. Accordingly, it is easy to form the toric surface by a lathe cutting process in comparison with the forming of it in the inner surface 2.

In the toric contact lens having the above-mentioned construction, the same effect of preventing the rotation as the ballast type is obtainable since the toric contact lens is formed to have a prism ballast shape as a whole whereby the gravity center is shifted downwardly. Further, since the upper and lower peripheral portions are shaved or cut, the deviation rate of the lens can be smaller than that of the prism ballast type. Accordingly, the largest thickness of the toric contact lens 1 (the thickness of the lowermost portion of the toric lens 1 shown in FIG. 2) can be reduced, and at the same time, the thickness in the entire portion of the toric contact lens 1 can be reduced, whereby the feeling of wearing can be improved. Further, an amount of oxygen to be supplied to the cornea can be increased to thereby prevent the cornea from injuring.

Figure 3:
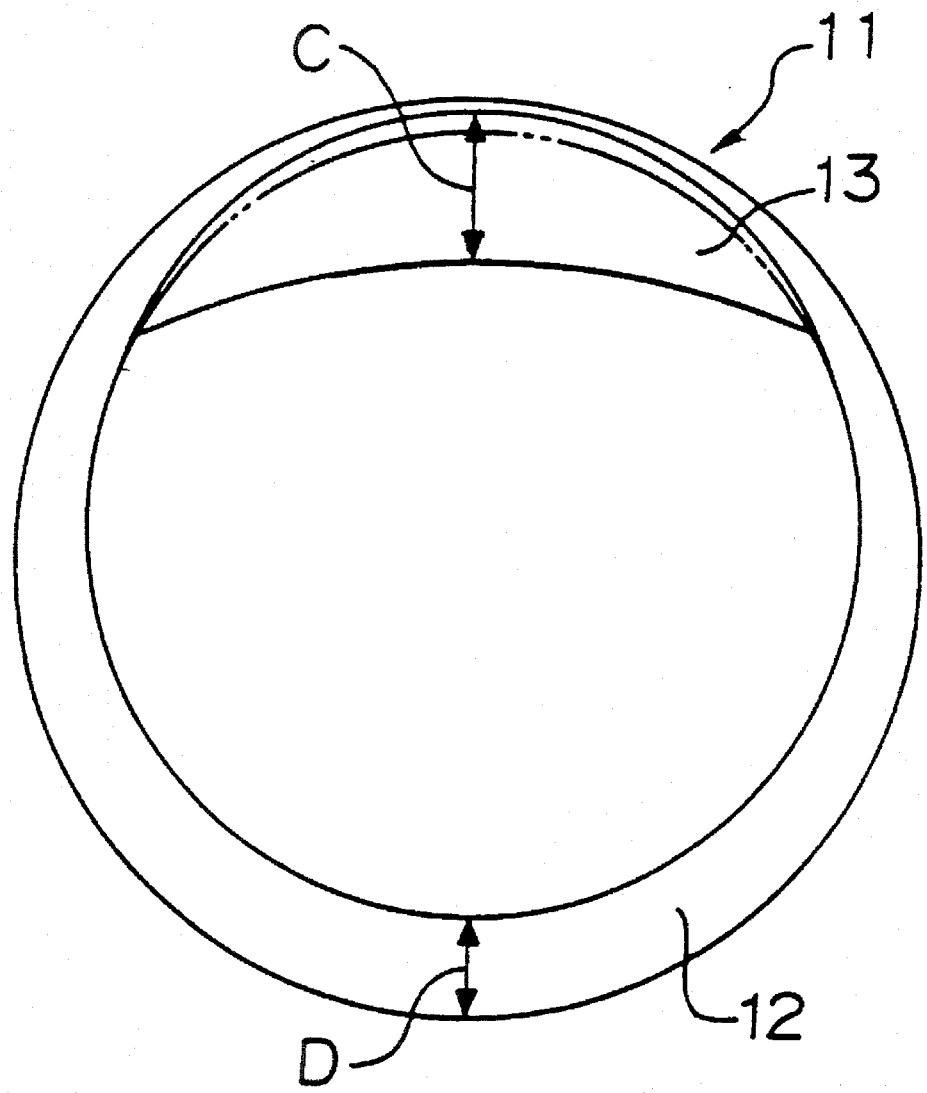
FIG. 3 is a front view showing another embodiment of the toric contact lens according to the present invention.

FIG. 3 shows another embodiment of the toric contact lens 11 according to the present invention. In this embodiment, the lower slab-off portion extends to the upper portion through both side portions. Namely, a lower cut surface 12 is first formed and then, an upper cut surface 13 is formed. In FIG. 3, two-dotted chain line designates the boarder line of the lower cut surface 12 which disappears by the formation of the upper cut surface 13. The toric contact lens 11 performs the same function as the toric contact lens 1.

Figure 4:
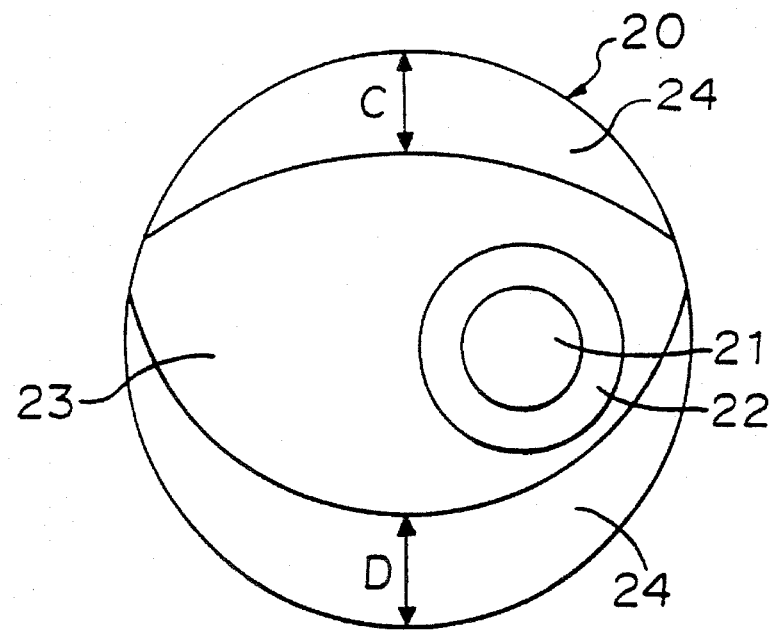
FIG. 4 is a front view showing another embodiment on the multifocal (bifocal) contact lens according to the present invention.

FIG. 4 shows a multifocal contact lens 20 for presbyopia as another embodiment of the present invention. The multifocal contact lens 20 has the same prism ballast and slab-off portions (the slab-off portions are indicated by cut surfaces 24) as the toric contact lens, shown in FIG. 1. An optical zone is formed between the cut surfaces which are provided at upper and lower portions of the lens. The optical zone is constituted by a near vision correction zone 21 to see near objects, a far vision correction zone 23 to see distant objects and an intermediate distance correction zone 22 having an intermediate function of correction of those of the near vision correction zone 21 and the far vision correction zone 23, which is formed between those zones 21, 23. As is clear from FIG. 4, in the optical zone of the contact lens 20, the near vision correction zone 21 and the intermediate distance correction zone 22 are shifted to the right side (the nose side) so as to be easy to watch near objects in a time of reading a book, for instance.

Figure 5:
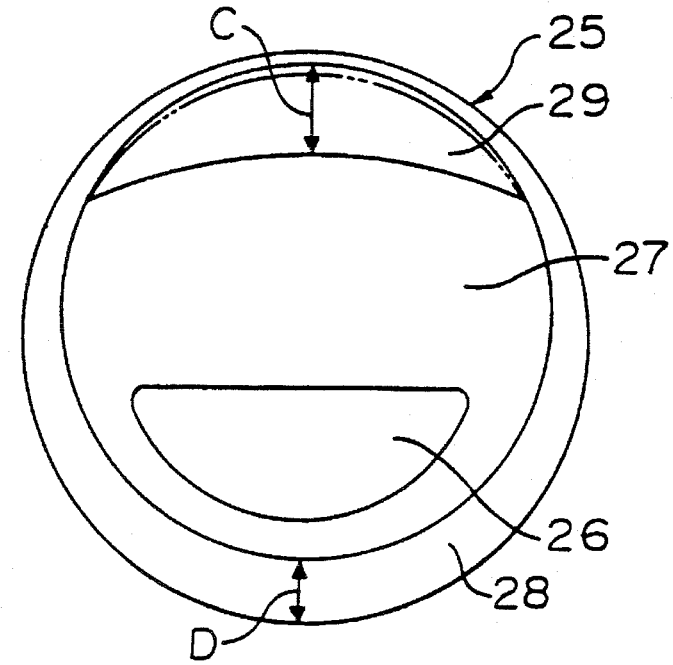
FIG. 5 is a front view showing a still another embodiment of the multifocal (bifocal) contact lens according to the present invention.

FIG. 5 shows a multifocal (bifocal) contact lens 25 for presbyopia as another embodiment of the present invention. In this embodiment, the contact lens 25 has the same prism ballast and slab-off portions (the slab-off portions are indicated by cut surfaces 28, 29) as the toric contact lens 11 shown in FIG. 3. Numeral 26 designates a near vision correction zone to see near objects formed at the front side of the contact lens 25, and numeral 27 designates a far vision correction zone to see distant objects. As is clear from FIG. 5, the contact lens 25 has the near vision correction zone 26 at its lower position so as to be capable of seeing near objects in a time of reading a book, for instance.

In either of the multifocal (bifocal) contact lenses shown in FIGS. 4 and 5, areas having different degree of lens power are not at positions of rotation symmetry in the front view of the lens. They are of a type that it is necessary for a wearer to wear it at a fixed eye position, in the same manner as the toric contact lens.

The deviation rate of the lens is preferably selected from the range of 2.5%–7.5% because when the deviation rate exceeds 7.5%, the lens becomes thick by the requirement in the parameters, and on the other hand, when it is less than 2.5%, a sufficient effect of ballast cannot be obtained. In order to effectively obtain stability on the rotation of the lens, it is preferable to select the deviation rate in a range of 3.5–5.5%.

The ballast formed in the contact lens of the present invention is of the prism ballast type. Accordingly, the surface of the lens is very smooth unlike the conventional contact lens wherein the lower portion is simply weighed. Accordingly, the feeling of wearing is further improved.

In designing the contact lens 1, 11, 20 or 25 having the construction described above, the deviation rate of the lens is first determined. Then, the deviation quantity of the lens (namely, the distance of the gravity center from the geometric center) is calculated so as to obtain the predetermined deviation rate of the lens. Then, the prism quantity of the lens and the width of slab-off portions are set. It is natural to consider the deviation quantity of the lens due to the toric or multifocal (bifocal) surface in the designing of the contact lens 1, 11, 20 or 25.

Figure 6:
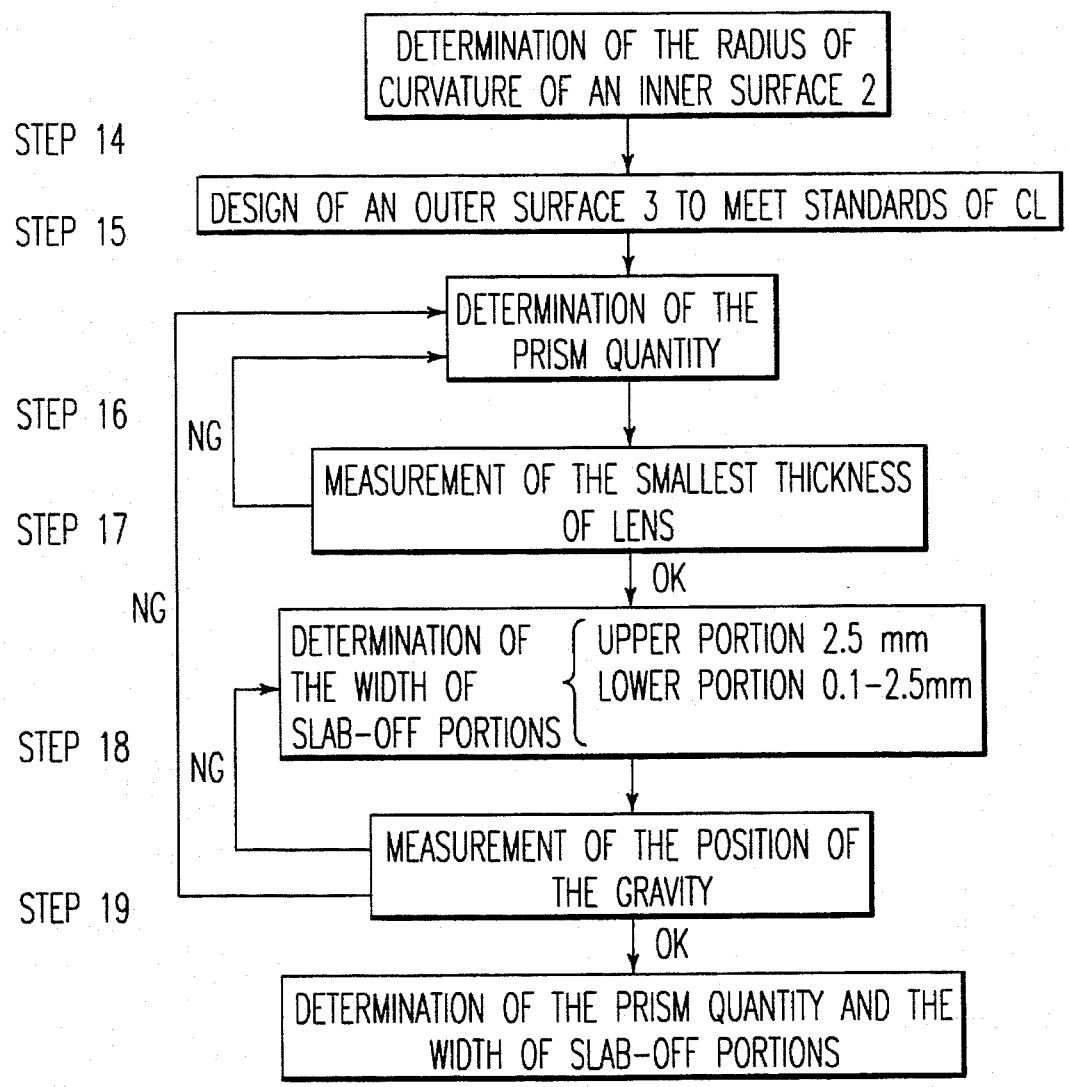
FIG. 6 is a flowchart showing steps of designing the toric contact lens of the present invention.
Figure 7:
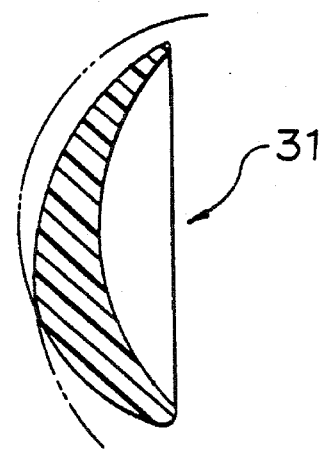
FIG. 7 is a cross-sectional view of a conventional contact lens.
Figure 8:
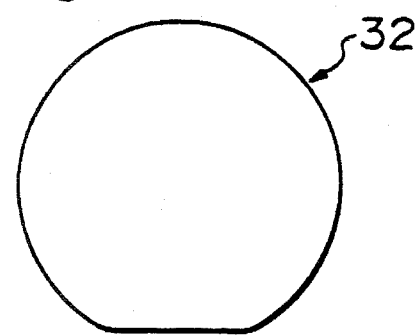
FIG. 8 is a front view showing another conventional contact lens.
Figure 9:
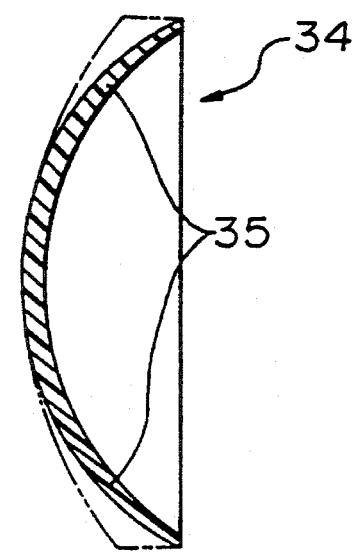
FIG. 9 is a cross-sectional view showing another conventional contact lens.

A flowchart in FIG. 6 shows preferred steps of the design for the toric contact lens.

First, the smallest thickness $t_{min}$ of the toric contact lens 1 by which the necessary strength can be obtained is set. The smallest thickness $t_{min}$ varies depending on material used and is set in consideration of various conditions. Further, a desired deviation quantity H for the lens is also set.

Then, the radius of curvature of the inner surface 2, i.e. the base curve (BC) is set so as to meet the shape of the cornea of a wearer (Step 14).

In the following, the outer surface 3 is so designed as to meet desired parameters of contact lens (e.g. the degree of spherical power, the degree of cylindrical power, the axis of correction for astigmatism and so on) in consideration of the previously set base curve (Step 15).

Then, the prism quantity (the degree of prism diopter) is optionally set (Step 16).

Then, the thickness of the lens is measured (Step 17). Since the toric contact lens 1 is formed to have a prism ballast, the geometric center of the inner surface 2 does not coincide with that of the outer surface 3. Accordingly, since the position where the thickness of the lens is the smallest is a position other than the geometric center or the spherical portion of the contact lens, the smallest thickness of the lens is set by examining the thickness of the lens at various positions. As a result, when the smallest value in the thickness t of the lens indicates the smallest thickness portion $t_{min}$, the next step is taken. Otherwise, the procedure is returned to Step 16 to set the prism quantity (the degree of prism) again.

Then, the width of the upper and lower slab-off portions is set (Step 18). In the setting, the width of the upper slab-off portion (the width C in FIGS. 1 and 3) should be maintained to be as great as possible to thereby obtain a large deviation quantity, which can further improve the effect of preventing the rotation. Accordingly, a large value (e.g. 2.5 mm) should be previously set, however, the value may be an optional value.

Then, the position of gravity center (deviation quantity) is calculated (Step 19). In the calculation, when the deviation quantity assumes a deviation quantity H, which has been initially set, or higher, the prism quantity (the degree of prism diopter) and the width of the slab-off portions which have been obtained in the previous steps are set as formal values. When the deviation quantity is less than H, the sequential step is returned to Step 18 where the width of the slab-off portions is set again. In this case, when the width C of the upper slab-portion is 2.5 mm, the width D of the lower slab-off portion (FIG. 1 and FIG. 3) is limited to 0.1 mm–2.5 mm so that the effective width of the optical portion 10 of the toric contact lens 1 can be assured.

In case that a desired deviation quantity cannot be obtained even by the operation at Step 18, the sequential step is returned to Step 16 where the prism quantity (the degree of prism) is set again.

When there is scattering in dimension of the toric contact lens designed by the above-mentioned steps and by using the same parameter, the toric contact lens 1 having the smallest thickness is employed in consideration of the thickness at various positions (the thickness at the central portion, the peripheral portions and so on) of the lens.

In manufacturing the toric contact lens 1 designed by the above-mentioned steps, a lathe cutting process or a molding process which can render the manufacture easy may be used.

The multifocal (bifocal) contact lens of the present invention can be designed in the same manner as the toric contact lens described above. Further, it can be manufactured by either process of lathe cutting or molding.

In the embodiments described above, description has been made as to the contact lens in which the toric or multifocal (bifocal) surface is formed in the outer surface. However, the present invention is not limited to the embodiments, and a toric or multifocal (bifocal) surface may be formed in the inner surface or both surfaces.

According to the toric or multifocal (bifocal) contact lens of the present invention, the following advantages are obtainable. The rotation of the lens can be effectively prevented. Excellent feeling of wearing is obtainable. It is safe in use because a sufficient amount of oxygen to the cornea can be assured. Further, the flexibility of the design is obtainable because restriction to the parameter of the lens can be substantially expanded. Further, since the prism quantity (the degree of prism) can be smaller than the conventional technique, an adverse optical effect such as polarization can be reduced.

We claim:

1. A contact lens for preventing a rotation of the lens on an eye during use, the contact lens comprising:

an inner surface formed so as to meet a shape of a cornea of a wearer; and an outer optical surface which has a predetermined degree of lens power and is formed in asymmetrical rotation with respect to a geometrical center of the lens;

a center axis of the outer surface being deviated downwardly with respect to a center axis of the inner surface so that a gravity center of the lens is shifted downwardly with respect to the geometrical center of the lens;

spherical thin wall regions are formed in at least upper and lower peripheral portions of the lens so as to define a smooth outer periphery of the lens;

smooth borders are defined between said spherical thin wall regions and the outer optical surface; and a deviation rate of the gravity center from the geometrical center is from 2.5 to 7.5%.

2. A contact lens according to claim 1, wherein an optical zone on the outer optical surface is defined between said thin wall regions, said optical zone having a toric surface.

3. The contact lens according to claim 1, wherein an optical zone on the outer optical surface is defined between said thin wall regions, the optical zone comprising a near vision correction zone, a far vision correction zone and an intermediate distance correction zone, wherein the near vision correction zone and the intermediate distance correction zone are off-centered and positioned towards a nose of a wearer during use.

4. The contact lens according to claim 1, wherein an optical zone on the outer optical surface is defined between said thin wall regions, the optical zone comprising a near vision correction zone and a far vision correction zone, wherein the near vision correction zone is located below the far vision correction zone.

5. A contact lens for preventing a rotation of the lens on an eye during use, the contact lens comprising:

an inner surface and an outer surface, wherein a central axis of the outer surface is positioned lower than a central axis of the inner surface, such that a thickness of the lens increases in a downward direction of the lens, and a gravity center of the lens is deviated downwardly from a geometric center of the lens, wherein spherical thin wall regions are formed in at least upper and lower peripheral portions of the lens so as to define a smooth outer periphery of the lens, wherein an optical zone on the outer surface is defined between the thin wall regions and smooth borders are defined between said thin wall regions and said outer surface.

6. The contact lens according to claim 5, wherein a deviation rate of the gravity center of the lens from the geometric center is in a range from 2.5% to 7.5%.

* * * * *